(12) United States Patent
Gresset et al.

(10) Patent No.: US 8,650,845 B2
(45) Date of Patent: Feb. 18, 2014

(54) IDLER WITH A DEFLECTOR AND WEB WRAP DEVICE

(75) Inventors: Pascal Gresset, Arc-les-Gray (FR);
Michel Menetrier, Beaujeu (FR);
Emmanuel Chapon, Velet (FR)

(73) Assignee: Deere & Company, Moline, IL (US)

( * ) Notice: Subject to any disclaimer, the term of this patent is extended or adjusted under 35 U.S.C. 154(b) by 101 days.

(21) Appl. No.: 13/106,436

(22) Filed: May 12, 2011

(65) Prior Publication Data

US 2012/0117918 A1 May 17, 2012

(30) Foreign Application Priority Data

May 17, 2010 (EP) ..................................... 10163015

(51) Int. Cl.
*B65B 11/56* (2006.01)
(52) U.S. Cl.
USPC ..................... 53/556; 53/587; 53/588; 53/203
(58) Field of Classification Search
USPC .............. 53/556, 587, 588, 389.2, 389.4, 203
See application file for complete search history.

(56) References Cited

U.S. PATENT DOCUMENTS

| | | | | |
|---|---|---|---|---|
| 1,563,704 A | * | 12/1925 | Greis ............................... | 26/105 |
| 4,729,213 A | * | 3/1988 | Raes ................................ | 56/341 |
| 5,005,747 A | * | 4/1991 | Anstey .......................... | 226/190 |
| 5,137,196 A | * | 8/1992 | Ardueser et al. .............. | 226/194 |
| 5,230,193 A | * | 7/1993 | Underhill et al. ............... | 53/556 |
| 5,491,956 A | * | 2/1996 | Donnelly et al. ................ | 53/399 |
| 6,006,504 A | * | 12/1999 | Myers et al. .................... | 53/556 |
| 6,477,824 B2 | * | 11/2002 | Preheim ......................... | 56/341 |
| 6,550,218 B2 | * | 4/2003 | McClure et al. ................ | 53/118 |
| 6,619,011 B2 | * | 9/2003 | Anstey et al. ................... | 53/118 |
| 6,622,454 B2 | * | 9/2003 | Anstey ............................ | 53/118 |
| 6,651,403 B2 | * | 11/2003 | Anstey ............................ | 53/118 |
| 6,769,224 B2 | * | 8/2004 | Anstey et al. ................... | 53/118 |
| 7,464,523 B2 | * | 12/2008 | Vande Ryse et al. ........... | 53/587 |
| 7,707,802 B2 | * | 5/2010 | Forrest ........................... | 53/399 |
| 7,805,912 B2 | * | 10/2010 | Viaud et al. ................... | 53/389.4 |
| 7,946,095 B2 | * | 5/2011 | Olander .......................... | 53/118 |
| 2002/0184861 A1 | * | 12/2002 | McClure et al. ................ | 53/587 |
| 2002/0189200 A1 | * | 12/2002 | Anstey et al. ................... | 53/118 |

FOREIGN PATENT DOCUMENTS

EP 0225398 6/1987
EP 2113165 11/2009

* cited by examiner

*Primary Examiner* — Hemant M Desai
*Assistant Examiner* — Eyamindae Jallow
(74) *Attorney, Agent, or Firm* — Quarles & Brady LLP

(57) ABSTRACT

An Idler is provided for a web wrap device. The idler has a deflector acting on web moved over the idler. The deflector has areas of different deflection intensity over its area of contact with the web.

8 Claims, 4 Drawing Sheets

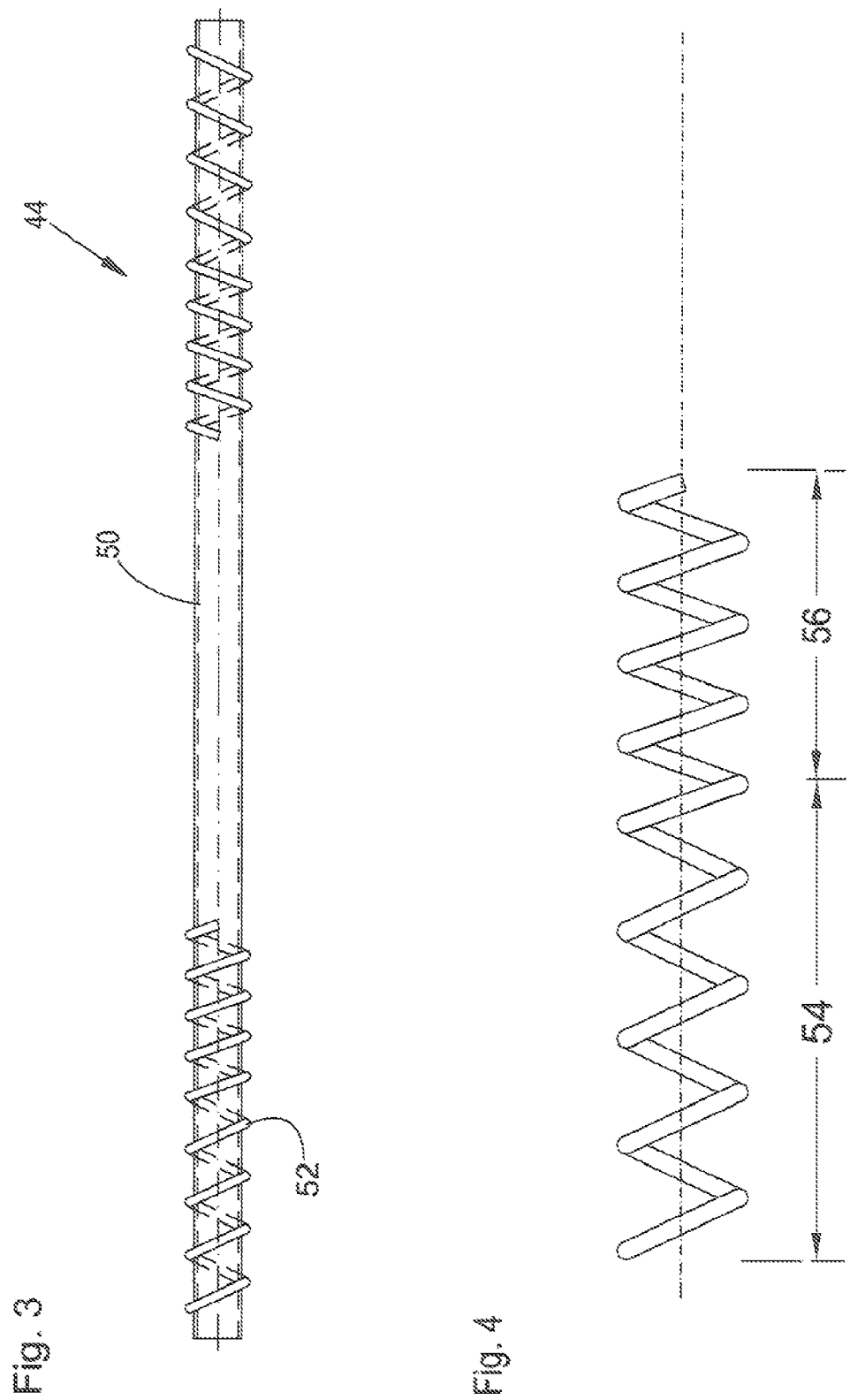

IDLER WITH A DEFLECTOR AND WEB WRAP DEVICE

FIELD OF THE INVENTION

This invention relates to an idler designed to operate in a web wrapping device and having a deflector acting on web moved over the idler as well as to a web wrapping device.

BACKGROUND OF THE INVENTION

It is known, for example from European Patent Application EP 225 398 51, to use a spiral idler in the run of a web, such as net for wrapping an agricultural bale, in order to stretch said web over the entire width of a bale chamber.

SUMMARY OF THE INVENTION

The problem on which this invention is based relates to cases, wherein due to external forces the web is moved substantially to the center area of the idler and needs to be moved very fast to the outer area, without moving beyond a defined lateral position.

By means of the teachings herein the more aggressive axially inner area of the idler has a strong impact on the web and thus moves it rapidly to the outer regions. Having normal deflectors in the outer areas avoids, that the web moves too far. The deflection intensity or aggressiveness of the deflector can be changed in several different ways, like by one or more spirals of different pitches or of different radial extensions or different grip, due to its surface formation.

Instead of a single deflector, a set several deflectors of different aggressiveness on subsequent idlers may be used and applied against the web, depending on the need, which need can be determined mechanically or electrically.

If a deflector is adjustable, such as through variations in pitch, location, elevation, inclination or the like it is possible to adjust to situations of varying circumstances. Such different situations can come from a different type of net, of material to be wrapped, moisture, unevenness of the bale in a variable chamber baler, uneven pull on the net by the bale, etc.

An adjustment to the situation on the go is possible by the use of a control circuit and an actuator controlled by the control circuit, whereas the actuator acts on the pitch, radial extension and/or the contact of one or the other idler with the web. Such a control circuit may work best if it is electronic and uses one or more sensors, watching the web run and the need for correction.

While it is possible and within the scope of this invention, to have an idler, which is stationary it creates less friction on the web, when the idler is rotatable.

A web wrap device with such an idler can be used e.g. in a round baler, and/or a wrapper for enclosing a bale with plastic.

BRIEF DESCRIPTION OF THE DRAWINGS

The invention is described in detail below with reference to the accompanying drawings wherein:

FIG. 3 is an idler of the web wrap device according to FIG. 2;

FIG. 4 is a deflector of the idler;

DESCRIPTION OF THE PREFERRED EMBODIMENT

Figure 1:
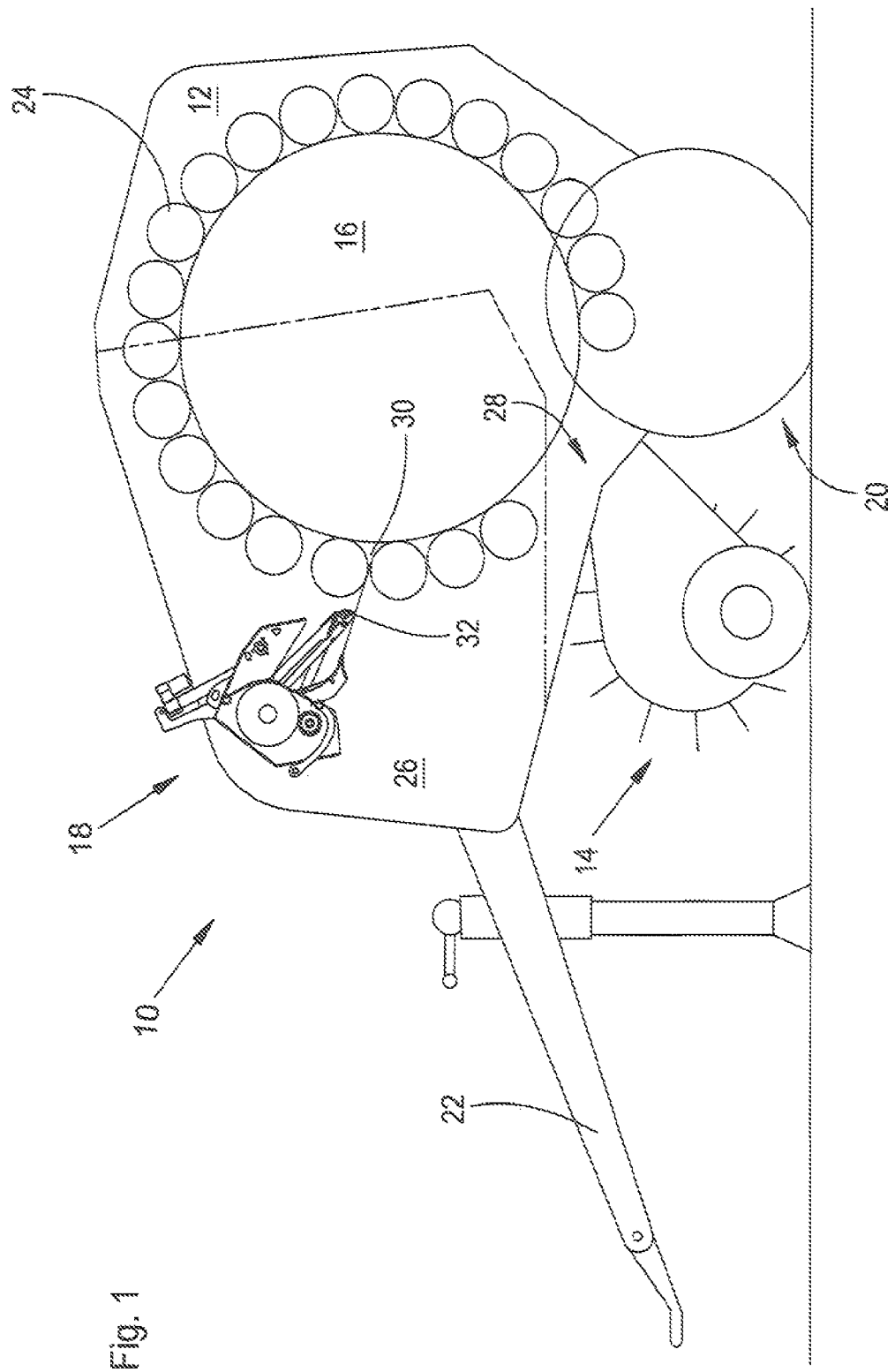
FIG. 1 is a round baler in side view and schematic depiction with a web wrap device.

FIG. 1 shows a round baler 10, which has a chassis 12, a pick-up 14, a bale chamber 16, a web wrap device 18, an axle with wheels 20, a tongue 22 and bale forming elements 24.

The round baler 10 is of an ordinary fixed chamber design, but could also be a variable chamber baler.

The chassis 12 rests on the axle with wheels 20, carries the pick-up 14 and can be connected to a tractor or the like by way of the tongue 22. The chassis 12 has substantially one or multiple part side walls 26, which are spaced apart from each other to receive between them the bale chamber 16, the web wrap device 18 and the bale forming elements 24.

The pick-up 14 picks up crop from the ground and delivers it to the bale chamber 16 through a crop inlet 28 between bale forming elements 24.

The bale chamber 16 is covered substantially by the bale forming elements 24 on the circumference and by the side walls 26 on the face side. Beside the crop inlet 28 a gap 30 is provided between the bale forming elements 24 through which web 32 may be fed into the bale chamber 16. The bale chamber 16 serves to form a cylindrical bale of hay, straw or the like, which will be covered by the web 32 of plastic, net, paper or similar. The bale forming elements 24 this embodiment are in the form of steel rolls rotatably received in the sidewalls 26 and extending perpendicular to them. These bale forming elements 24 are arranged substantially on a circle.

Figure 2:
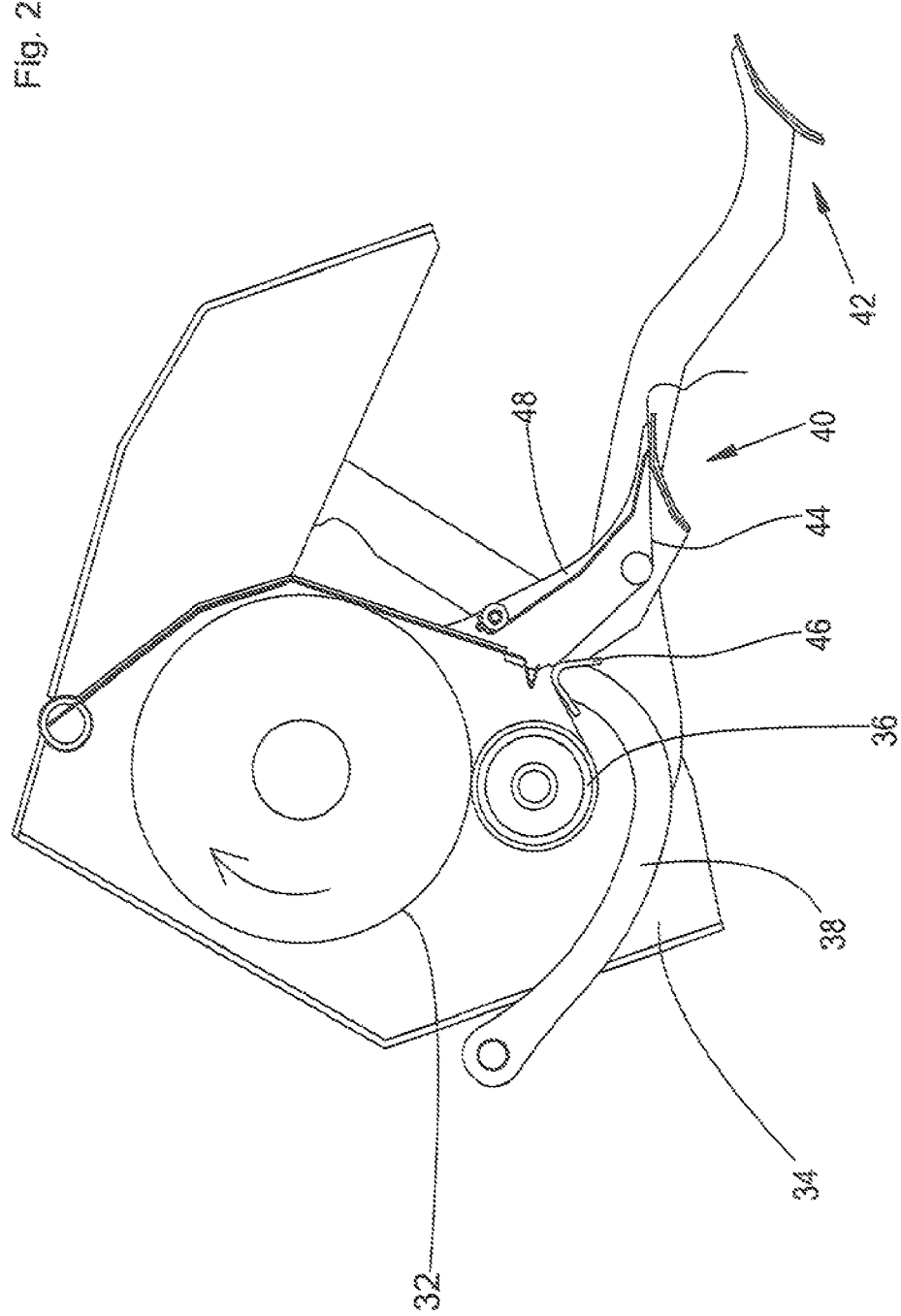
FIG. 2 is the web wrap device in larger scale and in a start position.

The web wrap device 18 is visible in more detail in FIG. 2 and contains among other things a housing 34, a roll 36, a tensioning mechanism 38, a web carrier 40, a knife assembly 42 and an idler 44. Except for the idler 44 the web wrap device 18 could be of any other known type.

The housing 34 consists of sheet metal and holds a roll of web 32.

The roll 36 extends horizontally between the sidewalls 26 and carries the roll of web 32 alongside. The roll 36 is surrounded by the web 32 on a portion of its circumference and is preferably covered with rubber to transport the web 32. In order to feed the web 32 from the roll to the bale chamber 16 the roll 36 is rotated by the web carrier 40 pulling the web 32 over the roll 36. Alternatively the roll 36 may be driven by a motor or another driven component of the round baler 10, once the bale has reached the desired diameter.

The tensioning mechanism 38 has an idler 46, which is located such, that it acts on the span of the web 32 between the roll 36 and the web carrier 40. The tensioning mechanism 38 provides for a good gripping effect due to a high degree of circumferential coverage of the rubber coated roll 36 on the web 32, which will cause considerable tension in the web 32 when the bale rotating in the bale chamber 16 starts pulling the web 32 faster than the roll 36 will release.

The web carrier 40 is moveable between start position as shown in FIG. 1 and an delivery position (not shown), in order to start and complete a wrapping cycle, thereby pulling web 32 over the idler 46 of the tensioning mechanism 38 as well as over the idler 44. Such a web carrier 40 is described in more detail e.g. in European Patent Application EP 2 113 165 A1.

The knife assembly 42 is formed as usual, i.e. with a sharp edge, which is moved into the run of the web 32, when the wrapping cycle is terminated. Such a knife assembly 42 is also well described in European Patent Application EP 2 113 165 A1.

The idler 44 is formed as a roll of metal or plastic and is freely rotatably received in distal arms 48 of the web carrier 40. The longitudinal axis of the idler 44 extends parallel to the idler 46 and transverse to the travel path of the web 32. The idler 44 is located such, that it is always in contact with the web 32, irrespective of the position of the idler 46 and the location of the web carrier 40. The idler 44 is shown in more detail in FIG. 3 and has an idler body 50 and in this embodiment one deflector 52 on each side. The deflectors 52 have zones of different deflection intensity, namely a zone with less and a zone with more deflection intensity 54 and 56 respectively.

The idler body 50 is a simple cylindrical tube with means, like holes, clamps or welding to fix at least the ends of the deflector (not shown).

The deflector 52 is formed as a spiral of round cylindrical metal wire of the same diameter along its length. The deflector 52 could also be formed as a groove or otherwise, machined, as a weld or of different material, like plastic. The deflector 52 is carried by the idler body 50 against which it rests. Instead of two deflectors 52 only one may be provided, which extends over the entire length of the idler body 50 or several deflectors 52 could be used following each other along the longitudinal axis of the idler 44.

The pitch of the deflector 52 in its zone of less deflection intensity 54 may be 50 mm, whereas in the zone of more deflection intensity 56 the pitch may be 25 mm, both as example only. The deflectors 52 may reach until the end of The idler body 50 or terminate earlier, as is shown in FIG. 3. As is visible in FIG. 3 the zones of more deflection intensity 56 are each arranged in the longitudinal center area of the idler 44.

Figure 5:
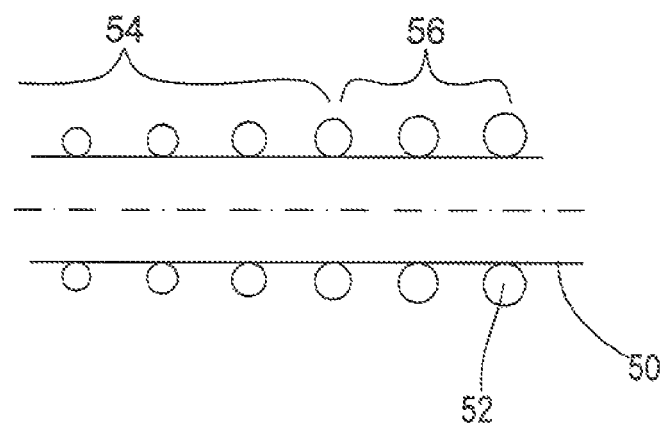
FIG. 5 is another deflector of idler.

FIG. 5 shows a portion of an idler 44, in which the zone of more deflection intensity 56 is formed by a deflector 52 of increased thickness, i.e. radial extension. This leads to a stronger impact on the web 32 and assures its movement along the longitudinal axis of the idler 44. As an alternative the idler body 50 may be of growing diameter with a deflector 52 of constant radial extension. The zones 54, 56 may be clearly distinguished or transforming into each other gradually.

Figure 6:
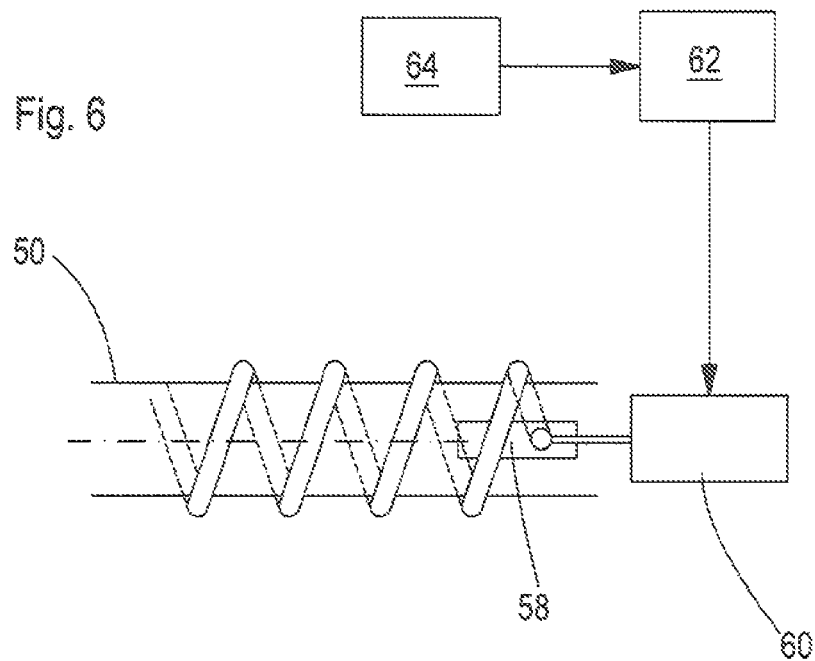
FIG. 6 is yet another deflector of the idler.

FIG. 6 illustrates an idler 44 with a deflector 52 of constant radial extension slidably received with one end area on the idler body 50, whereas the slidable, end extends through a slot 58 in the idler body 50 to the interior of latter, where it is retained by a moveable end of an actuator 60, The actuator 60 is controlled by a control circuit 62, which receives signals from a sensor 64. The signals are indicative of a need to move the web 32 more or less laterally. Depending on the detected need the actuator 60 will extend or retract and thus change the pitch of the deflector 52. As an alternative instead of the slot 58 several holes may be provided in the same zone, into which the end of the deflector 52 may be inserted manually to adjust the pitch.

Having described the preferred embodiment, it will become apparent that various modifications can be made without departing from the scope of the invention as defined in the accompanying claims.

The invention claimed is:

1. An idler for a web wrap device, the idler having a deflector acting on a web moved over the idler, wherein the deflector includes one or more spirals around the idler, wherein the deflector includes an area of varying deflection intensity over the deflector's area of contact with the web, and wherein the area of varying deflection intensity includes one or more of a region of the one or more spirals that includes a varying spiral pitch and a region of the one or more spirals that includes a varying radial extension of the one or more spirals with respect to the idler.

2. An idler according to claim 1, wherein the area of varying deflection intensity includes a region of the one or more spirals that includes a varying grip.

3. An idler according to claim 1, wherein the deflector is formed as a set of deflectors provided on different subsequent idlers.

4. An idler according to claim 1, wherein the deflector is adjustable.

5. An idler according to claim 1, wherein the idler is retained rotatably.

6. A web wrap device having an idler according to claim 1 upstream of a web carrier.

7. A web wrap device according claim 6, wherein a control circuit and an actuator controlled by the control circuit are provided, the actuator acting to adjust at least one of the varying pitch of the one or more spirals, and the varying radial extension of the one or more spirals.

8. A web wrap device according to claim 7, wherein the deflector includes an extension that is received within an interior region of the idler and is retained within the interior region of the idler by a moveable end of the actuator; and wherein the moveable end of the actuator controllably moves to adjust the varying spiral pitch.

* * * * *